United States Patent
Kim et al.

(10) Patent No.: US 10,826,797 B2
(45) Date of Patent: Nov. 3, 2020

(54) SYSTEM AND METHOD FOR PROCESSING NETWORK PACKETS BASED ON NFV FOR ENSURING HIGH AVAILABILITY

(71) Applicant: FOUNDATION OF SOONGSIL UNIVERSITY INDUSTRY COOPERATION, Seoul (KR)

(72) Inventors: Young Han Kim, Seoul (KR); Dinh Ngoc Thanh, Seoul (KR)

(73) Assignee: FOUNDATION OF SOONGSIL UNIVERSITY INDUSTRY COOPERATION, Seoul (KR)

(*) Notice: Subject to any disclaimer, the term of this patent is extended or adjusted under 35 U.S.C. 154(b) by 156 days.

(21) Appl. No.: 16/162,746

(22) Filed: Oct. 17, 2018

(65) Prior Publication Data

US 2019/0190795 A1    Jun. 20, 2019

(30) Foreign Application Priority Data

Dec. 15, 2017    (KR) .................. 10-2017-0173247
Mar. 6, 2018    (KR) .................. 10-2018-0026586

(51) Int. Cl.
*H04L 12/24*    (2006.01)
*G06F 9/50*    (2006.01)
(Continued)

(52) U.S. Cl.
CPC ...... *H04L 41/5041* (2013.01); *G06F 9/45558* (2013.01); *G06F 9/5027* (2013.01);
(Continued)

(58) Field of Classification Search
CPC ............. H04L 41/5041; H04L 43/0805; G06F 9/45558; G06F 9/5027; G06F 9/5077; G06F 2009/45595
(Continued)

(56) References Cited

U.S. PATENT DOCUMENTS 9,628,380 B2 *   4/2017   Xia .................. H04L 45/58
9,794,187 B1 *  10/2017   Felstaine .......... G06F 9/45558
(Continued)

FOREIGN PATENT DOCUMENTS

KR    10-2017-0079887 A    7/2017

OTHER PUBLICATIONS

Dinh et al., An Efficient Availability Guaranteed Deployment Scheme for IoT Service Chains over Fog-Core Cloud Networks, Sensors, 1-19 (Nov. 2018) (Year: 2018).*

(Continued)

*Primary Examiner* — David P Zarka
(74) *Attorney, Agent, or Firm* — Hauptman Ham, LLP

(57) ABSTRACT

A system and method for processing network packets based on NFV for ensuring high availability are disclosed. The disclosed system may include: at least one server, where a multiple number of VNF's for performing particular service functions are formed in the at least one server, each of the VNF's including at least one VNF instance; and a control apparatus that sequentially selects an M number of VNF's and selects one VNF instance from each of the selected M number of VNF's to configure an SFC, where the control apparatus may calculate an availability cost ratio value associated with each of the at least one VNF instance within VNF i+1 with respect to a VNF instance selected from VNF i (i being an integer from 1 to M) and may select a VNF instance within the VNF i+1 corresponding to the maximum value among the availability cost ratio values.

5 Claims, 7 Drawing Sheets

(51) Int. Cl.
    *G06F 9/455*     (2018.01)
    *H04L 12/26*     (2006.01)

(52) U.S. Cl.
    CPC ........ *G06F 9/5077* (2013.01); *H04L 43/0805* (2013.01); *G06F 2009/45595* (2013.01)

(58) Field of Classification Search
    USPC ........................................................ 709/220
    See application file for complete search history.

(56) References Cited

U.S. PATENT DOCUMENTS

| | | | |
|---|---|---|---|
| 9,794,352 B2* | 10/2017 | Qiang | H04L 67/1002 |
| 9,806,979 B1* | 10/2017 | Felstaine | G06F 11/2002 |
| 10,341,201 B2* | 7/2019 | Zhang | H04L 47/82 |
| 10,497,035 B1* | 12/2019 | Felstaine | G06Q 30/0603 |
| 10,606,718 B1* | 3/2020 | Sandlerman | G06F 11/203 |
| 2017/0371692 A1* | 12/2017 | Connolly | G06F 9/45558 |
| 2018/0069749 A1* | 3/2018 | Singhal | G06F 9/5077 |
| 2018/0107504 A1* | 4/2018 | Kano | H04L 63/0272 |

OTHER PUBLICATIONS

Dinh et al., An Efficient Improvement Potential-based Virtual Network Function Selection Scheme for Reliability/Availability Improvement, 2018 International Conference on Information Networking (ICOIN), 461-63 (Jan. 2018) (Year: 2018).*

Korean Office Action for corresponding Korean application No. 10-2018-0026586 dated Aug. 30, 2019, citing the above references.

\* cited by examiner

FIG. 3

Algorithm 1 Primary VNF Embedding Scheme

INPUT: $G(N, L)$, A set of SFC requests $S = \{s_k | k = 1, 2, 3, 4, ..., K\}$, $s_k = \{f_1^k, f_2^k, ..., f_m^k\}$
OUTPUT: The primary VNF embedding plan
Initialize: Calculate $r_{ij}^c$ for related VNF instance $j$
Repeat
  for all $s_k \in S$ do
    for $i = 1; i \leq m; i++$ do
      if $AvailableVNFInstances(f_i^k) \geq 1$ then
        SelectMaxRCR(AvailableVNFInstances($f_i^k$));
      else
        ProximityBasedNewVNFDeployment($f_i^k$);
      end if
    end for
    $R_{s_k}$ = ReliabilityCheck($s_k$);
    if $R_{s_k} \geq R_{s_k}^{requirement}$ then
      Complete();
    else
      CCIBasedRedudancyAllocation();
    end if
  end for
UNTIL $\forall s_k$, $s_k$ is embedded or resources run out.

FIG. 6

Algorithm 2 CCI-based VNF Redundancy Allocation

INPUT: $G(N, L)$, A set of SFCs $S = \{s_k | k = 1, 2, 3, 4, ..., K\}$ where $R_{s_k} < R_{s_k}^{requirement}$, $s_k = \{f_1^k, f_2^k, ..., f_m^k\}$

OUTPUT: The VNF redundancy allocation embedding plan

Initialize: Calculate $I_f^{CCI}(f_i^k)$, $f_i^k \in s_k \in S$

Repeat
    for all $s_k \in S$ do
        while $R_{s_k} < R_{s_k}^{requirement}$ do
            MaxCCIBasedVNFRedundancyAllocation($s_k$);
            $R_{s_k}$ = ReliabilityCheck($s_k$);
        end while
    end for
UNTIL $\forall s_k, R_{s_k} \geq R_{s_k}^{requirement}$ or resources run out.

SYSTEM AND METHOD FOR PROCESSING NETWORK PACKETS BASED ON NFV FOR ENSURING HIGH AVAILABILITY

CROSS-REFERENCE TO RELATED APPLICATIONS

This application claims the benefit of Korean Patent Applications No. 10-2017-0173247, filed with the Korean Intellectual Property Office on Dec. 15, 2017, and No. 10-2018-0026586, filed with the Korean Intellectual Property Office on Mar. 6, 2018, the disclosure of which is incorporated herein by reference in its entirety.

BACKGROUND

1. Technical Field

Embodiments of the present invention relate to a system and method for processing network packets based on NFV for ensuring high availability.

2. Description of the Related Art

NFV (network function virtualization) technology is changing the way an administrator installs and maintains a service. By using network function virtualization, an administrator can implement network functions using software, implementing the network functions with software by way of VNF's (virtual network functions).

However, a service method using VNF's may include vulnerabilities such as software and hardware errors. That is, when an error occurs in a VNF, the operations of the entire process of an SFC (service function chain) can be halted.

Thus, while an NFV-based network requires higher availability compared to existing networks, simply embedding VNF's may not be sufficient to achieve high availability, and there is a need for additional improvements and security schemes.

SUMMARY OF THE INVENTION

To resolve problems in the related art such as that described above, an aspect of the present invention proposes a system and method for processing network packets based on NFV for ensuring high availability.

Other objectives of the invention can be derived by the skilled person from the embodiments set forth below.

To achieve the objective above, an embodiment of the invention may provide a system for processing network packets that includes: at least one server, where a multiple number of VNF's (virtual network functions) for performing particular service functions are formed in the at least one server, each of the VNF's including at least one VNF instance; and a control apparatus that sequentially selects an M number of VNF's (M being an integer of 2 or higher) from among the multiple VNF's and selects one VNF instance from each of the selected M number of VNF's to configure an SFC (service function chain), where the control apparatus may calculate an availability cost ratio value associated with each of the at least one VNF instance within VNF i+1 with respect to a VNF instance selected from VNF i (i being an integer greater than or equal to 1 and smaller than or equal to M) and may select a VNF instance within the VNF i+1 corresponding to the maximum value among the availability cost ratio values.

The availability cost ratio value can be proportional to the availability of a VNF instance within the VNF i+1 and can be inversely proportional to a hop-number distance between a VNF instance selected from the VNF i and the VNF instance within the VNF i+1.

The control apparatus can measure the availability importance of each of the M number of VNF's and can add a VNF instance in the VNF having the highest availability importance from among the measured availability importance, if the configured SFC has an availability value smaller than or equal to a predetermined threshold availability value.

The availability importance of the VNF can be calculated by using the number of SFC's having the VNF as an element, the availability of the VNF, and the resource cost required for adding a VNF instance in the VNF.

The availability importance of VNF i can be expressed by the equation shown below:

$$I_s^{CCI}(i) = \frac{I_s^{CR}(i)}{C_i^R}$$

where $$I_s^{CR}(i) = \sum_{f \in F_i} I_f^{CR}(i),$$

$$I_f^{CR}(i) = \frac{I_f^B(i)(1 - R_i)}{1 - R_f^{sfc}},$$

$$I_f^B(i) = \frac{\partial R_f^{sfc}(R_i)}{\partial R_i},$$

where $i_s^{CCI}(i)$ is the availability importance of VNF i, $C_i^R$ is the resource cost required for adding a VNF instance in VNF i, f is an SFC having VNF i included therein, $F_i$ is a set of SFC's configured in the system for processing network packets, $R_i$ is an availability of VNF i, and $R_f^{sfc}$ is an availability of the SFC having VNF i included therein.

Another embodiment of the invention may provide a system for processing network packets that includes: at least one server, where a multiple number of VNF's for performing particular service functions are formed in the at least one server, each of the VNF's including at least one VNF instance; and a control apparatus that sequentially selects an M number of VNF's (M being an integer of 2 or higher) from among the multiple VNF's and selects one VNF instance from each of the selected M number of VNF's to configure an SFC, where the control apparatus may measure the availability importance of each of the M number of VNF's and may add a VNF instance in the VNF having the highest availability importance from among the measured availability importance if the configured SFC has an availability value smaller than or equal to a predetermined threshold availability value.

Yet another embodiment of the invention may provide a method for processing network packets performed at a network packet processing system in which a multiple number of VNF's are formed. The method may include: selecting sequentially an M number of VNF's (M being an integer of 2 or higher) from among the plurality of VNF's; and configuring an SFC by selecting one VNF instance from each of the selected M number of VNF's, where the configuring may include calculating an availability cost ratio value associated with each of the at least one VNF instance within VNF i+1 with respect to a VNF instance selected from VNF i (i being an integer greater than or equal to 1 and smaller than or equal to M) and selecting a VNF instance within VNF i+1 corresponding to a maximum value among the availability cost ratio values.

A system and method for processing network packets based on NFV according to an embodiment of the invention can provide the advantage of ensuring high availability.

The advantages of the present invention are not limited to the advantage described above but rather encompass all advantages that can be inferred from the composition of the present invention as set forth in the detailed description of the invention and the scope of claims.

BRIEF DESCRIPTION OF THE DRAWINGS

FIG. 3 illustrates an algorithm for selecting a VNF instance for configuring an SFC according to an embodiment of the invention.

FIG. 6 illustrates an algorithm for adding a VNF instance according to an embodiment of the invention.

DETAILED DESCRIPTION OF THE INVENTION

In the present specification, an expression used in the singular encompasses the expression of the plural, unless it has a clearly different meaning in the context. In the present specification, terms such as "comprising" or "including," etc., should not be interpreted as meaning that all of the elements or steps are necessarily included. That is, some of the elements or steps may not be included, while other additional elements or steps may be further included. Also, terms such as "unit" or "module," etc., refers to a unit subject that processes at least one function or action, and such unit subject can be implemented as hardware or software or a combination of hardware and software.

Certain embodiments of the present invention are described below in more detail with reference to the accompanying drawings.

Figure 1:
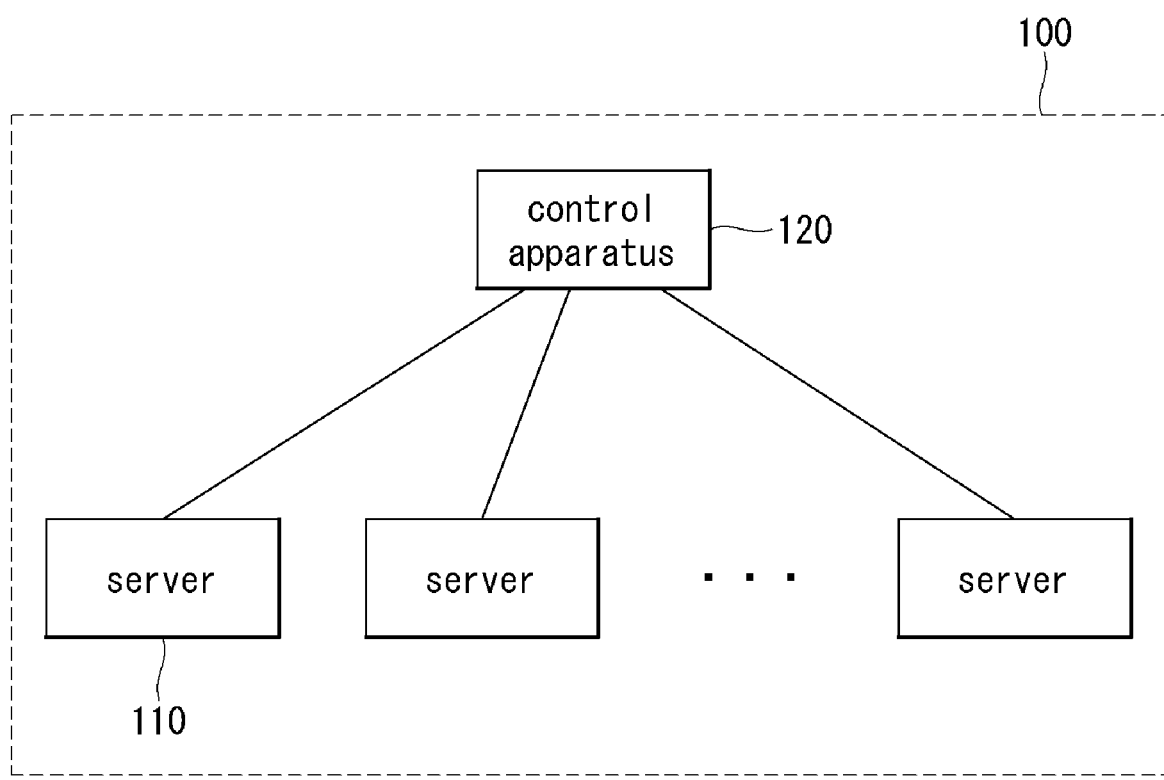
FIG. 1 conceptually illustrates the composition of a system for processing network packets according to an embodiment of the invention.

FIG. 1 conceptually illustrates the composition of a system for processing network packets according to an embodiment of the invention.

Referring to FIG. 1, a system 100 for processing network packets according to an embodiment of the invention may be a system that operates based on NFV (network function virtualization) and may include at least one server 110 and a control apparatus 120. The function of each component is described below in further detail.

Figure 2:
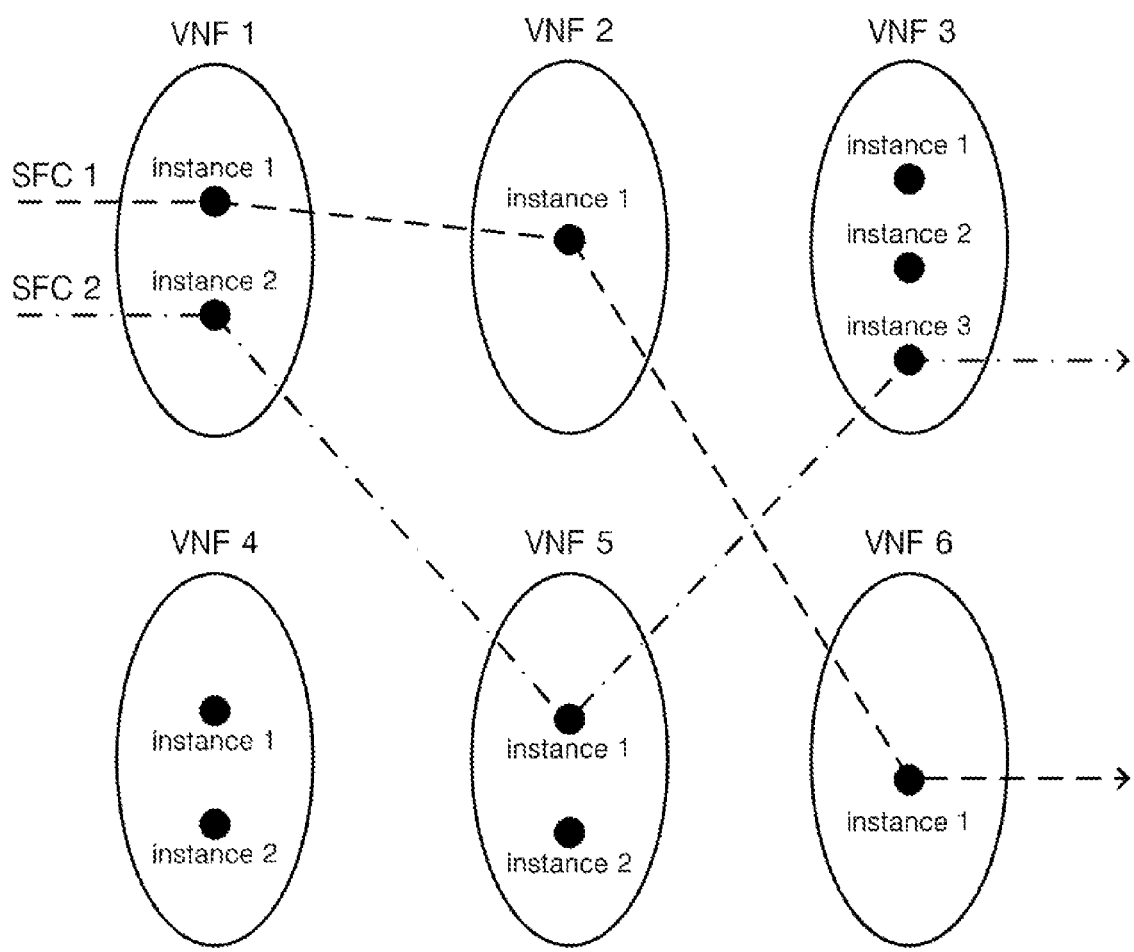
FIG. 2 illustrates the concept of VNF's within a system for processing network packets according to an embodiment of the invention.

The at least one server 110 may each include a processor and a memory and may have at least one VNF (virtual network function) formed for performing a particular service function, where each of the VNF's may include at least one VNF instance. Thus, a multiple number of VNF's may be formed in the network packet processing system 100. This is as illustrated in FIG. 2.

Here, the memory can be volatile and/or non-volatile memory and may store commands or data related to at least one other component of the server. Also, the processor can include one or more of a central processing unit (CPU), an application processor, and a communication processor.

The control apparatus 120 may also include a processor and a memory and may perform the action of configuring an SFC. To be more specific, the control apparatus 120 may sequentially select an M number of VNF's (M being an integer of 2 or higher) from among the multiple number of VNF's and may select and arrange a VNF instance from each of the selected M number of VNF's to configure the SFC (service function chain). This action can be performed at least once or more, as a result of which at least one SFC can be configured in the network packet processing system 100. This is as illustrated in FIG. 2.

Also, as mentioned above, the use of NFV technology may entail vulnerabilities such as software and hardware errors, and there is the problem that when a failure of a VNF occurs, the operations of the entire process of an SFC may be halted. Therefore, a network based on NFV requires higher availability (a value by which to determine whether or not a service can be maintained without halting) compared to existing networks. Thus, a control apparatus 120 according to an embodiment of the invention can configure the SFC by arranging VNF's (i.e. arranging the instances within the VNF's) to ensure high availability.

According to an embodiment of the invention, the control apparatus 120 can sequentially select and arrange VNF instances for an M number of VNF's. Supposing that one VNF instance was selected from VNF i (where i is an integer greater than or equal to 1 and smaller than or equal to M) among the M number of VNF's, the control apparatus 120 can calculate an availability cost ratio value associated with each of at least one VNF instance in VNF i+1 with respect to the VNF instance selected from VNF i and can select the VNF instance in VNF i+1 that corresponds to the maximum value among the at least one availability cost ratio values. The actions described above can be performed iteratively for all VNF's.

That is, the VNF instance selected from VNF i can have at least one availability cost ratio values, with each of the availability cost ratio values corresponding to at least one VNF instances included in VNF i+1, and the control apparatus 120 can select the VNF instance of VNF i+1 having the maximum value among the at least one VNF instances with respect to the VNF instance selected in VNF i. Here, the availability value of the SFC can correspond to a product of the availability values of the M number of VNF's, and the availability cost ratio values for the VNF instances are values calculated in order to increase the availability value of the SFC.

Here, the availability cost ratio value for VNF i can be proportional to the availability value of the VNF instance in VNF i+1 and inversely proportional to the hop-number distance between the VNF instance selected in VNF i and the VNF instance in VNF i+1. Here, it is supposed that the VNF instances included in all VNF's are interconnected as a tree structure, etc. The availability cost ratio value respect to VNF i can be expressed as Equation 1 shown below.

$$r^c_{i(i+1)} = \frac{R_{i+1}}{H_{i(i+1)}} \qquad \text{[Equation 1]}$$

Here, $r_{i(i+1)}{}^c$ represents the availability cost ratio value between the VNF instance selected in VNF i and a VNF instance in VNF i+1, $R_{i+1}$ represents the availability of a VNF instance in VNF i+1, and $H_{i(i+1)}$ represents the hop-number distance between the VNF instance selected in VNF i and a VNF instance in VNF i+1.

If there are no VNF instances present in a VNF, the control apparatus 120 can newly place a VNF instance in the VNF where there are no VNF instances present. A new VNF instance should be arranged as close as possible to the previous VNF to minimize the bandwidth expended. That is, if there are no VNF instances in VNF i+1, then a new VNF instance may be arranged as close as possible to VNF i.

Simply put, the control apparatus 120 can arrange VNF instances in a VNF such that the availability of the SFC is maximized, for the purpose of which availability cost ratio values can be used. This can be performed by the actions described above and can be expressed, for example, as the algorithm illustrated in FIG. 3.

Even when the SFC is configured efficiently as described above, it may occur that the availability of the SFC does not exceed the threshold availability value required by the network packet processing system 100. In this case, the control apparatus 120 can increase the availability of the SFC by arranging an additional VNF instance in a VNF.

Thus, according to an embodiment of the invention, the control apparatus 120 can measure the availability importance of each of the M number of VNF's forming the SFC, for an SFC of which the availability is smaller than or equal to a threshold availability value, and then add a VNF instance to the VNF having the highest availability importance from among the measured availability importance values.

Figure 4:
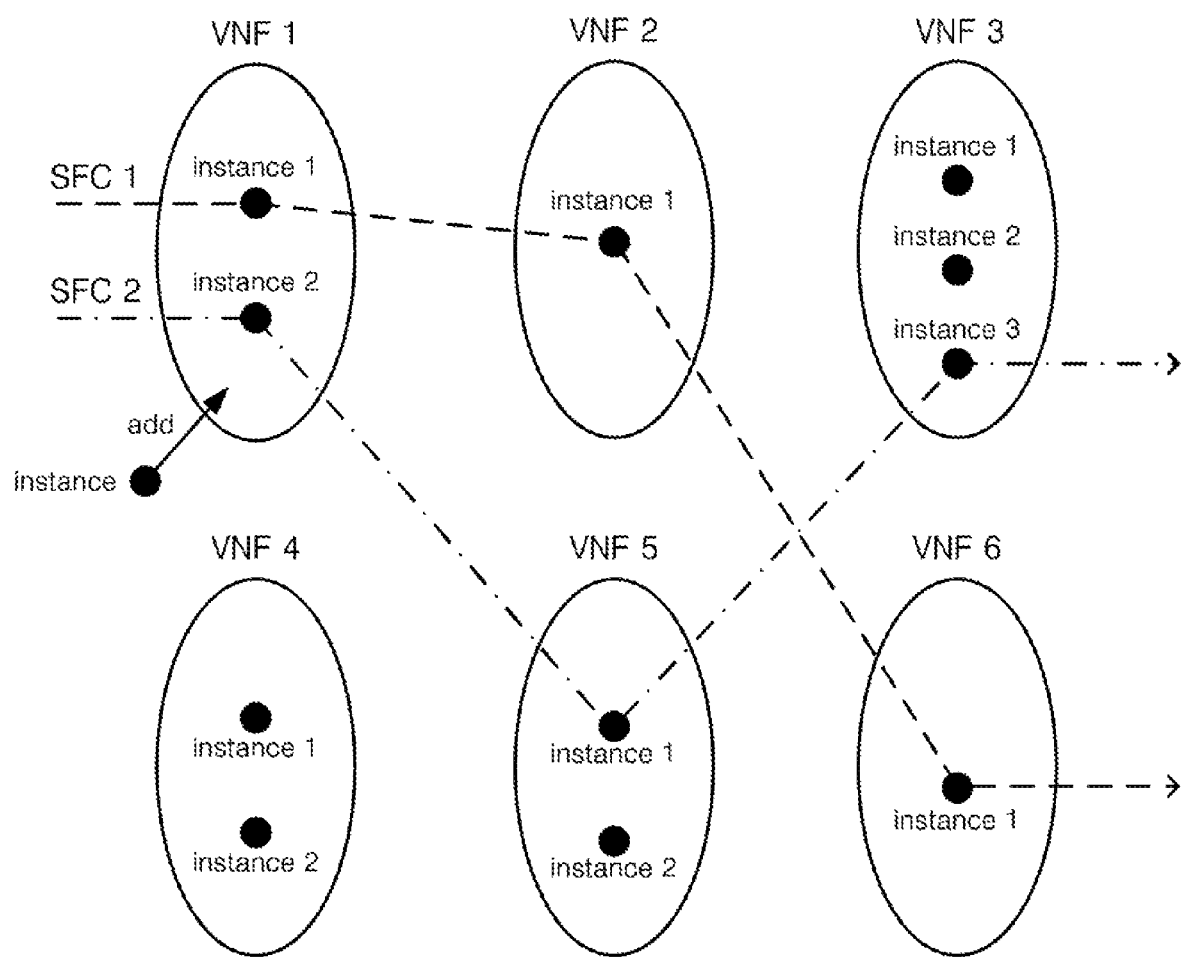
FIG. 4 illustrates the concept of adding a VNF instance in a system for processing network packets according to an embodiment of the invention.

Referring to FIG. 4 for example, if the availability of SFC 1 does not exceed the threshold availability value, and if the availability importance of VNF 1 is the highest from among the VNF's forming SFC 1, then the control apparatus 120 can add a new VNF instance in VNF 1.

Here, the availability importance of a VNF can be calculated by using the number of SFC's having the VNF as an element, the availability of the VNF, and the resource cost required for adding a VNF instance in the VNF. That is, the availability importance of VNF i can be expressed as Equation 2 shown below.

$$I_s^{CCI}(i) = \frac{I_s^{CR}(i)}{C_i^R} \qquad \text{[Equation 2]}$$

where $$I_s^{CR}(i) = \sum_{f \in F_i} I_f^{CR}(i),$$

$$I_f^{CR}(i) = \frac{I_f^B(i)(1 - R_i)}{1 - R_f^{sfc}},$$

$$I_f^B(i) = \frac{\partial R_f^{sfc}(R_i)}{\partial R_i}$$

Here, $I_s^{CCI}(i)$ is the availability importance of VNF i, $C_i^R$ is the resource cost required for adding a VNF instance in the VNF i, f is an SFC having the VNF i included therein, $F_i$ is a set of SFC's configured in the system for processing network packets, $R_i$ is an availability of the VNF i, and $R_f^{sfc}$ is an availability of the SFC having the VNF i included therein.

Below, the composition for an embodiment of the invention and the composition for the related art are compared, with reference to FIG. 5.

Figure 5:
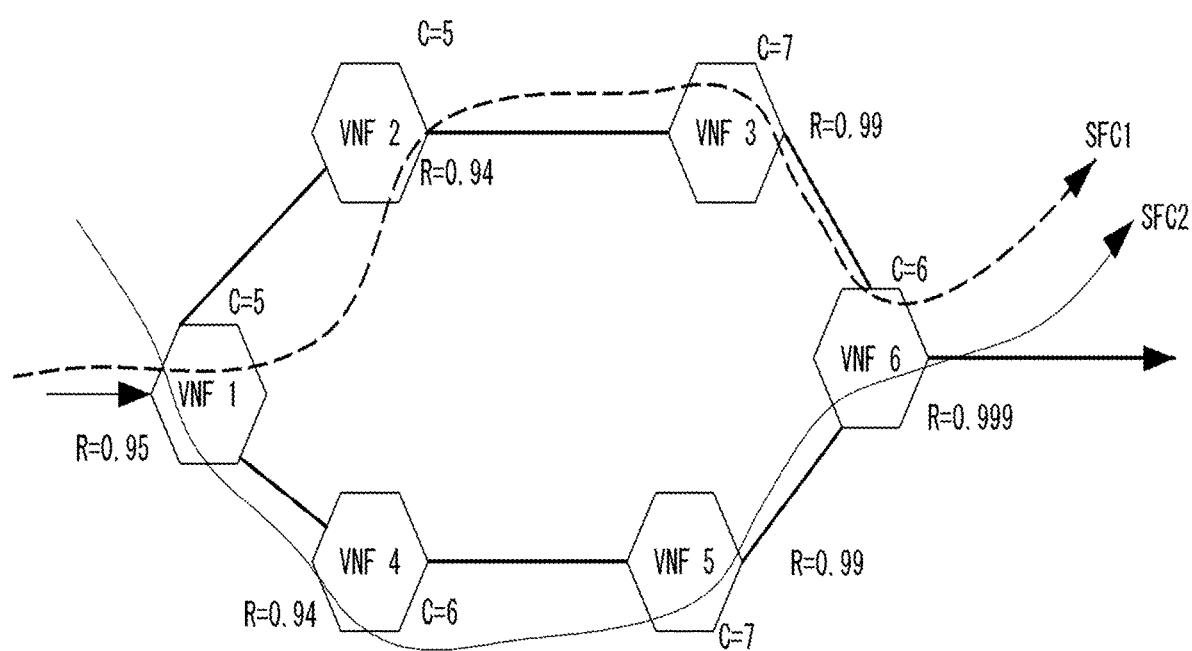
FIG. 5 is a diagram used for comparing the composition for an embodiment of the invention with the composition for the related art.

Referring to FIG. 5, supposing that there are two SFC's configured and that the threshold availability for the two SFC's is 0.92, the current availability of the two SFC's may be calculated as Equation 3 shown below.

$$R_{SFC1} = R_{SFC2} = 0.95*0.94*0.99*0.999 = 0.8831 \qquad \text{[Equation 3]}$$

The case for the related art is considered first in the following.

For SFC 1, VNF 2 having the lowest availability is selected, and a VNF instance is added. Here, the availability of VNF 2 with the VNF instance added (i.e. VNF 2') and the availability of SFC 1 updated for VNF 2' are as expressed by Equation 4 shown below.

$$R_{VNF2'} = 1 - (1-0.94)*(1-0.94) = 0.9964$$

$$R_{SFC1} = 0.95*0.9964*0.99*0.999 = 0.9277 \qquad \text{[Equation 4]}$$

Also, for SFC 2, VNF 4 having the lowest availability is selected, and a VNF instance is added. Here, the availability of VNF 4 with the VNF instance added (i.e. VNF 4') and the availability of SFC 2 updated for VNF 4' are 0.9964 and 0.9277, respectively.

Next, the case for an embodiment of the invention is considered as follows.

For SFC 1, the availability importance values of the four VNF's may be measured as described above. Supposing, for the sake of convenience, that either of VNF 1 and VNF 2 is to be selected, the availability importance of VNF 1 and the availability importance of VNF 2 may be expressed as Equation 5 shown below.

$$I_{SFC1}^B(VNF1) = I_{SFC2}^B(VNF1) = 0.94*0.99*0.999 = 0.9296 \qquad \text{[Equation 5]}$$

$$I_{SFC1}^{CR}(VNF1) = I_{SFC2}^{CR}(VNF1) = \frac{0.9296*(1-0.95)}{1-0.8831} = 0.3976$$

$$I_s^{CR}(VNF1) = I_{SFC1}^{CR}(VNF1) + I_{SFC2}^{CR}(VNF1) = 0.7952$$

$$I_s^{CCI}(VNF1) = \frac{I_s^{CR}(VNF1)}{5} = 0.159$$

$$I_{SFC1}^B(VNF2) = 0.95*0.99*0.999 = 0.9395$$

$$I_{SFC1}^{CR}(VNF2) =$$

$$I_s^{CR}(VNF2) = \frac{0.9395*(1-0.94)}{1-0.8831} = 0.4822$$

$$I_s^{CCI}(VNF2) = \frac{I_s^{CR}(VNF2)}{5} = 0.0964$$

Therefore, for SFC 1, since the availability importance of VNF 1 is the highest, a VNF instance may be added to VNF 1. In this case, the availability of VNF 1 with the VNF instance added (i.e. VNF 1') and the availability of SFC 1 updated for VNF 1' are 0.9975 and 0.9273, respectively.

Also, since VNF 1 is shared by SFC 1 and SFC 2, and since SFC 2 is made to have an availability value of 0.9273 (threshold availability: 0.92) due to VNF 1 having an updated availability value (i.e. VNF 1'), there is no other VNF instance added.

In short, an embodiment of the invention may have the VNF instance added in consideration of the number of SFC's having a VNF as an element, the availability of the VNF, and the resource cost required for adding the VNF instance in the VNF. Therefore, there is the advantage that the availability of all SFC's can be increased with minimal resources. The actions described above can be expressed, for example, as the algorithm illustrated in FIG. 6.

Figure 7:
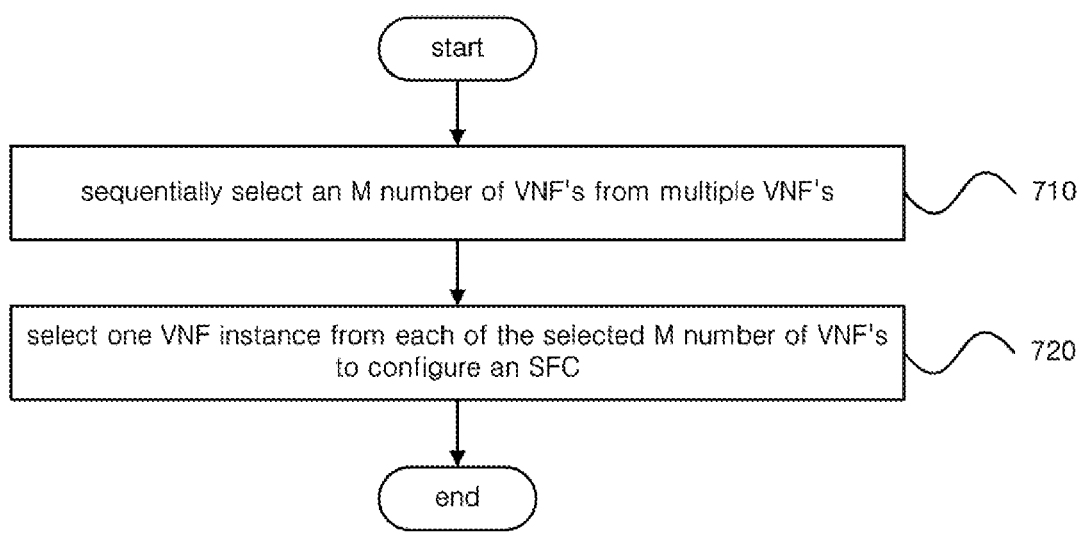
FIG. 7 is a flow diagram of a method for processing network packets according to an embodiment of the invention.

FIG. 7 is a flow diagram of a method for processing network packets according to an embodiment of the invention. The method for processing network packets can be performed by an apparatus that includes a processor, such as the control apparatus 120, for example. The procedure performed for each step is described below.

In step 710, an M number of VNF's may be selected sequentially from among a multiple number of VNF's.

Then, in step 720, an SFC may be configured by selecting one VNF instance from each of the selected M number of VNF's.

Here, in step 720, an availability cost ratio value associated with at least one VNF instance within VNF i+1 with respect to the VNF instance selected in VNF i can be calculated, and the VNF instance in VNF i+1 corresponding to the maximum of the availability cost ratio values can be selected.

Also, if the configured SFC has an availability value that does not exceed a predetermined threshold availability value, then in step 720, the availability importance of each of the M number of VNF's can be measured, and a VNF instance can be added to the VNF having the highest availability importance from among the measured availability importance values.

A control method for a network packet processing method according to certain embodiments of the invention have been set forth above. Features related to the system 100 for processing network packets described above with reference to FIGS. 1 to 6 are also applicable to these embodiments. As such, redundant explanations are omitted.

Certain embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A system for processing network packets, the system comprising:

at least one server, the at least one server having formed therein a plurality of virtual network functions (VNFs) for performing particular service functions, each of the plurality of VNFs including at least one VNF instance; and a control apparatus configured to sequentially select an M number of VNFs from among the plurality of VNFs and select one VNF instance from each of the selected M number of VNFs to configure a service function chain (SFC), where M is an integer of 2 or higher, wherein the control apparatus calculates an availability cost ratio value associated with each of the at least one VNF instance within VNF i+1 with respect to a VNF instance selected from VNF i and selects a VNF instance within the VNF i+1 corresponding to a maximum value among the availability cost ratio values, where i is an integer greater than or equal to 1 and smaller than or equal to M;

wherein the control apparatus measures an availability importance of each of the M number of VNFs and adds a VNF instance in a VNF having a highest availability importance from among the measured availability importance, if the configured SFC has an availability value smaller than or equal to a predetermined threshold availability value; and wherein the availability importance of the VNF is calculated by using a number of SFCs having the VNF as an element, an availability of the VNF, and a resource cost required for adding a VNF instance in the VNF.

2. The system for processing network packets according to claim 1, wherein the availability cost ratio value is proportional to an availability of a VNF instance within the VNF i+1 and is inversely proportional to a hop-number distance between a VNF instance selected from the VNF i and the VNF instance within the VNF i+1.

3. The system for processing network packets according to claim 1, wherein the availability importance of the VNF i is expressed by an equation shown below:

$$I_s^{CCI}(i) = \frac{I_s^{CR}(i)}{C_i^R}$$

where $$I_s^{CR}(i) = \sum_{f \in F_i} I_f^{CR}(i),$$

$$I_f^{CR}(i) = \frac{I_f^B(i)(1 - R_i)}{1 - R_f^{sfc}},$$

$$I_f^B(i) = \frac{\partial R_f^{sfc}(R_i)}{\partial R_i},$$

where $I_s^{CCI}(i)$ is the availability importance of the VNF i, $C_i^R$ is the resource cost required for adding a VNF instance in the VNF i, f is an SFC having the VNF i included therein, $F_i$ is a set of SFC's configured in the system for processing network packets, $R_i$ is an availability of the VNF i, and $R_f^{sfc}$ is an availability of the SFC having the VNF i included therein.

4. A system for processing network packets, the system comprising:
- at least one server, the at least one server having formed therein a plurality of virtual network functions (VNFs) for performing particular service functions, the plurality of VNF's each including at least one VNF instance; and
- a control apparatus configured to sequentially select an M number of VNFs from among the plurality of VNFs and select one VNF instance from each of the selected M number of VNFs to configure a service function chain (SFC), where M is an integer of 2 or higher,
- wherein the control apparatus measures an availability importance of each of the M number of VNFs and adds a VNF instance in a VNF having a highest availability importance from among the measured availability importance, if the configured SFC has an availability value smaller than or equal to a predetermined threshold availability value; and
- wherein the availability importance of the VNF is calculated by using a number of SFCs having the VNF as an element, an availability of the VNF, and a resource cost required for adding a VNF instance in the VNF.

5. A method for processing network packets performed at a system for processing network packets, the system having a plurality of VNF's virtual network functions (VNFs) formed therein, the method comprising:
- selecting sequentially an M number of VNFs from among the plurality of VNFs, where M is an integer of 2 or higher; and
- configuring a service function chain (SFC) by selecting one VNF instance from each of the selected M number of VNFs,
- wherein the configuring comprises calculating an availability cost ratio value associated with each of the at least one VNF instance within VNF i+1 with respect to a VNF instance selected from VNF i and selecting a VNF instance within the VNF i+1 corresponding to a maximum value among the availability cost ratio values, where i is an integer greater than or equal to 1 and smaller than or equal to M;
- wherein the configuring includes measuring an availability importance of each of the M number of VNFs and adding a VNF instance in a VNF having a highest availability importance from among the measured availability importance, if the configured SFC has an availability value smaller than or equal to a predetermined threshold availability value; and
- wherein the availability importance of the VNF is calculated by using a number of SFCs having the VNF as an element, an availability of the VNF, and a resource cost required for adding a VNF instance in the VNF.

\* \* \* \* \*